Patented July 25, 1939

2,167,317

UNITED STATES PATENT OFFICE 2,167,317

PROCESS OF PROTECTIVE COATING

Adolph Stenson, Elbow Lake, Minn.

No Drawing. Application March 25, 1938,
Serial No. 198,134

2 Claims. (Cl. 91—68)

This invention relates to process of providing protective coating on exterior surfaces especially on roofs, walls, and the like and also on interior walls in place of the usual plastering.

It is an object of the present invention to provide a novel process of coating surfaces of the type hereinbefore referred to characterized in that the coating so-prepared is substantially impervious to water and atmospheric conditions, generally, and is adaptable for use on any exterior surface which it is desired to coat.

It is also among the advantages of the process according to the present invention that it provides means for use of substantially dark colored bituminous sealing material even in instances wherein the final paint coat is to be of a substantially light color.

It is also a feature of the process according to the present invention that it eliminates the necessity of shingling roofs or putting siding on walls inasmuch as it is possible to make the ordinary outer wall surface substantially resistant to weathering and impervious to moisture in addition to providing an ornamental surface thereon.

Other features and advantages of the process according to the present invention will be apparent to those skilled in the art during the course of the following description.

Regarded in certain of its broader aspects, the process according to the present invention comprises treating a roof or wall surface with a viscid plastic mass such as a bituminous composition, mastic, plastic wood, plastic cement, or the like whereby cracks and crevices in the surface are substantially filled and a relatively smooth outer surface is provided. It is preferred that this plastic composition be applied by means of a trowel or a similar instrument although other means can be used if desired. It will also be apparent to those skilled in the art that if desired other plastic materials can be used to fill the cracks and pores of the exposed wall surface such, for example, as melted shellac, commercial grades of sealing wax, and the like. After the pores have been filled as aforesaid a composition is applied preferably by troweling. In the preferred embodiment of the present invention, this composition consists of Portland cement and a granular mineral substance commercially known as "Vermiculite", the two being mixed in equal proportions in water. The function of this second coating is to prevent bleeding of the plastic mass into the outer coating of paint and also to substantially protect the plastic material from weathering and also to make a hard durable surface. It is preferred that this second coating be allowed a substantial time to dry and/or harden, experience indicating that approximately seventeen to twenty hours is usually sufficient for this purpose. When this coating has dried, an exterior and final coat of high gloss enamel is applied. It will be particularly noted that although dark bituminous material be used in the initial step of sealing the pores of the surface that this material does not bleed into the outer paint coating due at least in part to the intermediate layer of the Vermiculite and cement composition. Accordingly, it is possible to utilize extremely low-grade and inexpensive varieties of bituminous pore filling compositions whereas heretofore it would have been necessary to employ a high-grade material of substantially light color in order to avoid bleeding into the outer paint coat. The novel process according to the present invention also permits the use of an exterior coat of substantially slow drying material, such as enamels based on spar or long oil varnishes and the like.

The chemical constituency of the substance "Vermiculite", hereinabove referred to, is silica 42.8%, iron and aluminum oxide 26.5%, calcium oxides 1.9%, magnesium oxide 24.9%, sodium and potassium oxides 3.9% approximately.

It will be apparent to those skilled in the art that certain variations in the process hereinbefore described can be made without substantial departure from the spirit of the present invention, but it is to be clearly understood that these variations are intended to be included within the scope of the following claims.

What is claimed is:

1. In the process of providing a protective weather resistant substantially water impervious coating upon an unfinished surface including, applying a plastic bituminous composition thereto whereby the pores, interstices, openings and cracks in said surface are substantially filled and a smooth face provided, the improvement which consists of applying to a surface so-prepared a composition comprising granular Vermiculite and Portland cement mixed in equal proportion in water to produce a substantially inert hardenable product, drying said surface so-prepared until it is in substantially non-tacky condition, and thereafter coating same with a layer of substantially long oil high gloss enamel.

2. In the process of providing a protective weather resistant substantially water impervious coating upon surfaces of wood, stone and the like including, applying to said surface a low-grade plastic bituminous composition whereby the pores, interstices, cracks and crevices are substantially filled and a smooth outer surface presented, the improvement which consists of applying to said surface a composition consisting of equal amounts of Portland cement and granular Vermiculite in water, permitting said last applied coating composition to dry to substantially non-tacky condition, and thereafter coating the surface so-prepared with a high gloss enamel of the long oil type.

ADOLPH STENSON.